United States Patent
Shoji et al.

(10) Patent No.: US 7,599,672 B2
(45) Date of Patent: Oct. 6, 2009

(54) MILLIMETER-WAVE-BAND RADIO COMMUNICATION METHOD IN WHICH BOTH A MODULATED SIGNAL AND AN UNMODULATED CARRIER ARE TRANSMITTED TO A SYSTEM WITH A RECEIVER HAVING PLURAL RECEIVING CIRCUITS

(75) Inventors: Yozo Shoji, Tokyo (JP); Kiyoshi Hamaguchi, Tokyo (JP); Hiroyo Ogawa, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 580 days.

(21) Appl. No.: 10/563,940

(22) PCT Filed: Jul. 29, 2003

(86) PCT No.: PCT/JP03/09585

§ 371 (c)(1),
(2), (4) Date: Jan. 10, 2006

(87) PCT Pub. No.: WO2005/011148

PCT Pub. Date: Feb. 3, 2005

(65) Prior Publication Data

US 2006/0160514 A1    Jul. 20, 2006

(51) Int. Cl.
    H04B 7/08    (2006.01)
(52) U.S. Cl. .................. 455/137; 455/258; 455/276.1
(58) Field of Classification Search .......... 455/63.4, 455/561, 562.1, 132, 137, 272, 273, 276.1, 455/255, 258, 296
    See application file for complete search history.

(56) References Cited

U.S. PATENT DOCUMENTS

| 5,513,222 | A  | * | 4/1996 | Iwasaki ................. 375/347 |
| 5,912,927 | A  | * | 6/1999 | Smith et al. ............ 375/299 |
| 6,205,224 | B1 |   | 3/2001 | Underbrink |
| 6,895,253 | B1 | * | 5/2005 | Carloni et al. .......... 455/506 |

(Continued)

FOREIGN PATENT DOCUMENTS

JP    08-213824    8/1996

(Continued)

*Primary Examiner*—Blane J Jackson

(57) ABSTRACT

A receiver receives an RF-band modulated signal transmitted from a transmitter, as well as an un-modulated carrier also transmitted from the transmitter and having a phase noise characteristic coherent with that of the modulated signal, and a product of the two components is generated to thereby restore an IF-band transmission source signal. In the receiver, a small planar antenna having a broad beam characteristic such as a single-element patch antenna is combined with an amplifier and a mixer circuit, which are formed on a micro planar circuit by an MMIC technique, so as to form a unit receiving circuit. A plurality of such unit receiving circuits are disposed on the receiver at intervals smaller than a wavelength corresponding to an IF band, and detection outputs from the unit receiving circuits are power-mixed. Thus, the receiver serves as a high-gain antenna having a detection function, and can realize a broad beam radiation characteristic comparable to that of a single-element antenna. The composed IF-band composite output is demodulated in an IF-band demodulation circuit. The present invention enables construction of a low-cost radio communication system, transmission of high-quality signals, and production of a wide beam antenna which has a high gain and which is convenient for use.

10 Claims, 8 Drawing Sheets

U.S. PATENT DOCUMENTS

| | | |
|---|---|---|
| 7,251,461 B2 * | 7/2007 | Shoji et al. .................. 455/101 |
| 2002/0132600 A1 * | 9/2002 | Rudrapatna .............. 455/277.1 |
| 2003/0092402 A1 * | 5/2003 | Shapira et al. .............. 455/101 |
| 2003/0109236 A1 | 6/2003 | Shoji et al. |
| 2003/0125091 A1 * | 7/2003 | Choi et al. .................. 455/562 |
| 2003/0162566 A1 * | 8/2003 | Shapira et al. .............. 455/561 |
| 2003/0236108 A1 * | 12/2003 | Li et al. .................. 455/562.1 |

FOREIGN PATENT DOCUMENTS

| | | |
|---|---|---|
| JP | 10-093335 | 4/1998 |
| JP | 11-186947 | 7/1999 |
| JP | 2000-115044 | 4/2000 |
| JP | 2001-053640 | 2/2001 |
| JP | 2002-246921 | 8/2002 |
| JP | 2003-179516 | 6/2003 |

* cited by examiner

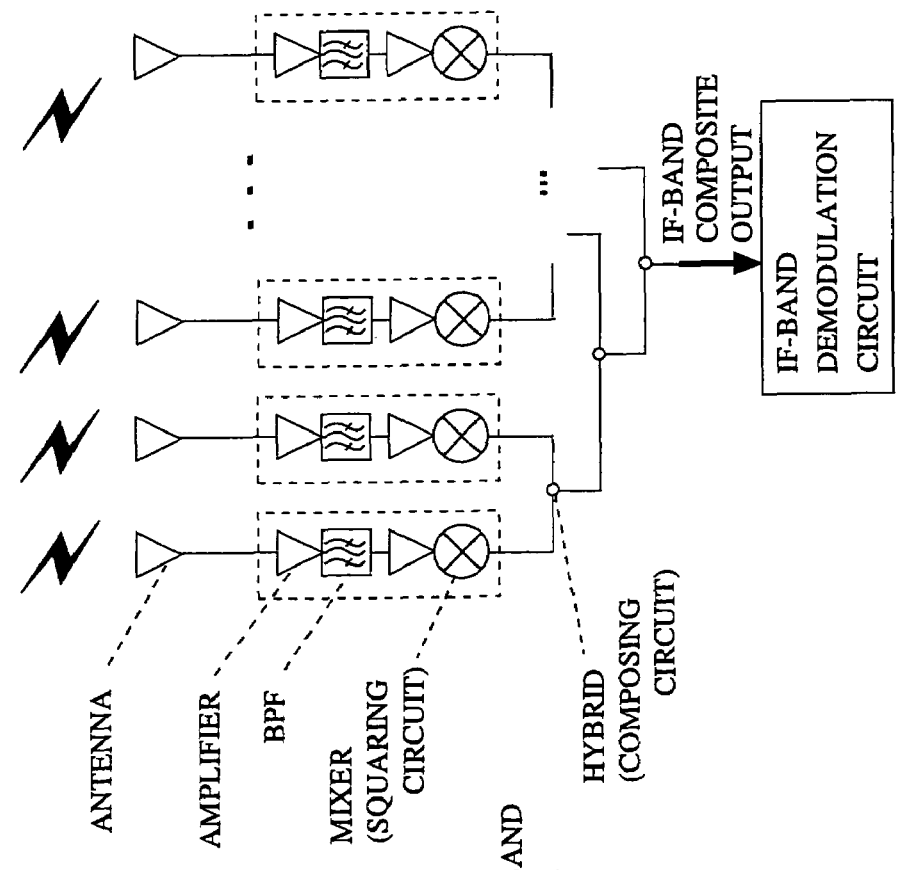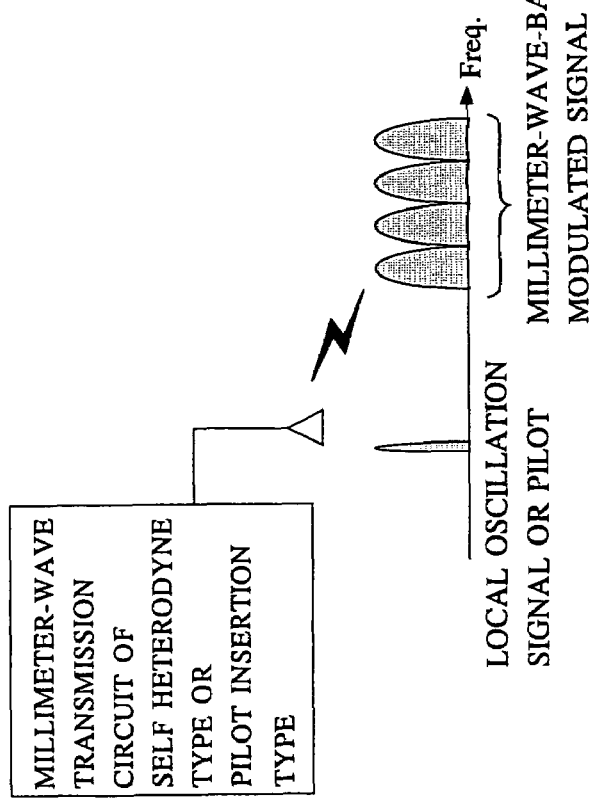

DETAILS OF RECEPTION ANTENNA AND DETECTION SECTION

EXAMPLE OF TWO-DIMENSIONAL ARRANGEMENT

EXAMPLE OF THREE-DIMENSIONAL ARRANGEMENT

MILLIMETER-WAVE-BAND RADIO COMMUNICATION METHOD IN WHICH BOTH A MODULATED SIGNAL AND AN UNMODULATED CARRIER ARE TRANSMITTED TO A SYSTEM WITH A RECEIVER HAVING PLURAL RECEIVING CIRCUITS

This application claims the benefit of PCT International Application Number PCT/JP03/09585 filed Jul. 29, 2003, the disclosure of which are incorporated herein by reference.

TECHNICAL FIELD

The present invention relates to a millimeter-wave-band radio communication method and system in which an RF-band modulated signal transmitted from a transmitter and a local oscillation signal also transmitted from the transmitter and having a phase noise characteristic coherent with that of the modulated signal are received by a receiver, and a product of the two components is generated to thereby restore an IF-band transmission source signal.

BACKGROUND ART

In general, a radio apparatus for transmitting a high-speed digital signal, a broadband analog signal, or the like is composed of a transmitter having a function of producing a product of an intermediate-frequency (IF) band signal and a local oscillation (LO) signal and performing up-conversion so as to generate and transmit a radio-frequency (RF) modulated signal, and a receiver having a function of receiving the RF modulated signal, obtaining a product of the RF modulated signal and an LO signal, and performing down-conversion so as to generate an IF signal. In such a case, in order to maintain the quality of the transmitted signal, the IF signal input to the transmitter and the IF signal generated in the receiver must have a predetermined frequency difference therebetween, and variation in the phase difference with time is required to be small. Therefore, the local oscillators which generate LO signals in the transmitter and the receiver must be excellent in frequency stability and must be low in phase noise. In particular, in ranges of microwaves and millimeter waves of high frequencies, a dielectric resonator or a PLL (phase lock loop) circuit is employed so as to improve stability and reduce noise.

However, as the frequency to be used increases (to, e.g., a millimeter band of 30 GHz or higher), realization of an oscillator having high stability and low noise becomes difficult, and production cost increases. For example, in the case where a dielectric resonator is used, the Q value (quality factor) of the dielectric resonator decreases, and a desired performance cannot be attained. In the case where a PLL circuit is used, formation of a frequency divider in particular becomes difficult, among other problems. There exists a method in which an LO signal is obtained through frequency multiplication of a signal from a low-frequency oscillator. However, in general, this method requires an amplifier for increasing signal strength, which results in increased cost, increased size, and increased power consumption.

In order to solve these problems, there has been proposed a radio communication apparatus (self-heterodyne scheme) shown in FIG. 9 (described in Japanese Patent Application Laid-Open (kokai) No. 2001-53640). In this example, an IF modulated signal of data input to a transmitter 81 is multiplied at a mixer 83 by a local oscillation (LO) signal from a local oscillator 85, and unnecessary components are removed by a band-pass filter 86 so as to generate a radio-frequency (RF) modulated signal. In a power mixer 87, a portion of the LO signal is added to the RF modulated signal. The resultant radio signal is amplified to a higher signal level by means of an amplifier 88, and then transmitted from an antenna Tx. Meanwhile, in a receiver 82, the radio signal received by means of an antenna Rx is amplified to a higher signal level by means of an amplifier 91, passed through a filter 92 within the receiver, and demodulated into an IF signal at a squaring unit 93. In this method, an LO signal which is the same as that used for generation of the RF signal is transmitted as a radio signal. Accordingly, this method is advantageous in that influence of phase noise of the local oscillator 85, serving as an LO signal source, is canceled at the time of demodulation, and the IF signal obtained through demodulation has the same frequency as that of the original IF signal input to the transmitter.

Further, Japanese Patent Application Laid-Open (kokai) No. 2002-246921 discloses a transmission circuit in which an transmission IF modulated signal and an un-modulated carrier whose frequency is separated from the modulated signal by a frequency interval corresponding to a proper frequency of an IF signal obtained through demodulation at a receiver side are mixedly up-converted to a millimeter-wave band by use of a millimeter-wave band local oscillation signal.

DISCLOSURE OF THE INVENTION

However, several problems may arise when an actual radio system is designed and constructed. At high frequencies, such as in a millimeter band, signal transmission loss is large, and the self-heterodyne scheme as described above exhibits a greater degree of sensitivity deterioration than does a conventional up-converter scheme. Therefore, an antenna having a relatively high gain must be used at least for a receiving antenna. In order to attain a high antenna gain at high frequencies, such as in a millimeter band, a plurality of antenna elements may be disposed in array, and signals from the individual antenna elements are mixed in phase (this is called an array antenna). However, in order to enable in-phase mixing of the signals from the individual antenna elements of the array antenna, in view of short wavelengths in the millimeter band, the antenna elements require machining accuracy which matches dimensional tolerance sufficiently smaller than the millimeter order. Therefore, cost of the antenna increases, or obtaining an expected high gain performance becomes very difficult.

Moreover, when the antenna gain is increased through employment of an array antenna, although the gain can be increased in general in the maximum radiation direction, the array antenna has an antenna characteristic; i.e., a radiation angle versus relative gain characteristic (directivity characteristic) such that the antenna has a high gain only in a certain direction (very narrow pencil beam), and has side robes containing null points where the antenna gain is zero.

The object of the present invention is to solve the above-described problem and to enable construction of a low-cost radio communication system, transmission of high-quality signals, and production of a wide beam antenna which has a high gain and which is convenient for use.

According to the present invention, a receiver receives an RF-band modulated signal transmitted from a transmitter, as well as an un-modulated carrier also transmitted from the transmitter and having a phase noise characteristic coherent with that of the modulated signal, and a product of the two components is generated to thereby restore an IF-band transmission source signal. In the receiver, a small planar antenna having a broad beam characteristic such as a single-element patch antenna is combined with an amplifier and a mixer circuit, which are formed on a micro planar circuit by an MMIC technique, so as to form a unit receiving circuit. A plurality of such unit receiving circuits are disposed on the receiver at intervals sufficiently smaller than a wavelength corresponding to an IF band, and detection outputs from the unit receiving circuits are power-mixed. Thus, the receiver serves as a high-gain antenna having a detection function, and can realize a broad beam radiation characteristic comparable to that of a single-element antenna.

In a millimeter-wave-band radio communication method and system according to the present invention, a plurality of receiving circuits, each formed as a single constituent element by combining a small receiving antenna and a planar receiving circuit, are disposed at intervals sufficiently smaller than a wavelength corresponding to an IF band; and detection outputs obtained through detection at the individual receiving circuits are mixed so as to output an IF-band composite output, which is then demodulated. Before being mixed to obtain the IF-band composite output, the detection outputs from the individual receiving circuits undergo phase adjustment and amplitude weighting.

In the present invention, three or more receiving circuits may be provided and disposed at irregular intervals which differ from one another. The receiving circuits may be disposed two-dimensionally along longitudinal and transverse directions, or disposed three-dimensionally. The antenna used in the transmitter may be for circularly polarized waves, and half the antennas used in the receiver may be for horizontally polarized waves with the remaining antennas being for vertically polarized waves.

BRIEF DESCRIPTION OF THE DRAWINGS

FIGS. 1(A) and 1(B) are diagrams exemplifying a basic configuration of transmission and receiving circuits of a radio communication system which embodies the present invention.

BEST MODE FOR CARRYING OUT THE INVENTION

FIGS. 1(A) and 1(B) are diagrams exemplifying a basic configuration of transmission and receiving circuits of a radio communication system which embodies the present invention, wherein FIG. 1(A) shows a transmitting side, and FIG. 1(B) shows a receiving side. The transmitting side is formed by a millimeter-wave transmission circuit of a self-heterodyne type or pilot insertion type, and transmits both a millimeter-wave band modulated signal and an un-modulated signal including a phase noise component and a frequency offset component which are synchronous with those of the modulated signal. On the receiving side, a signal received by means of each of a plurality of small receiving antennas is amplified by means of an amplifier, and then passed through a band-pass filter BPF so as to remove unnecessary components therefrom. After being amplified again, the signal is detected by means of a mixer circuit which functions as a squaring circuit. Detection outputs are mixed or composed in multiple stages by use of a plurality of composing circuits. Finally, a single IF-band composite output is obtained through power mixing, and is fed to an IF-band demodulation circuit.

Figure 2:
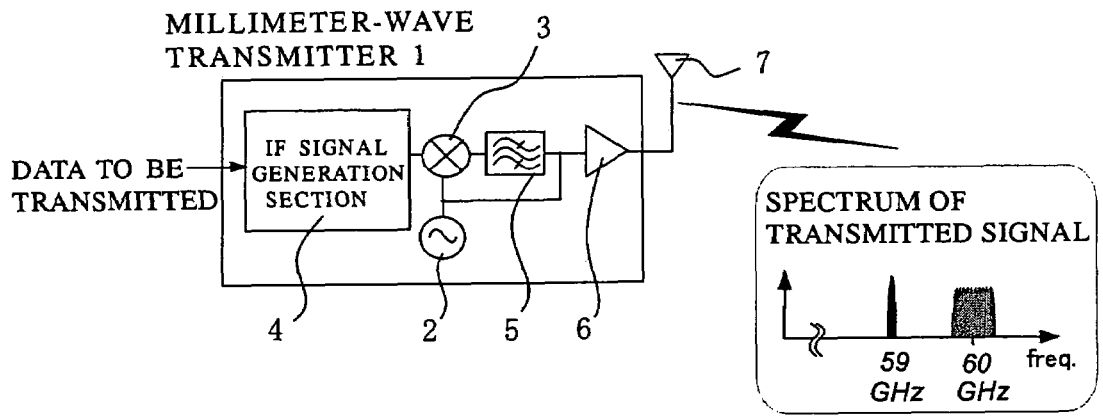
FIG. 2 is a diagram exemplifying the configuration of a transmitter.

FIG. 2 is a diagram exemplifying the configuration of a transmitter. The millimeter-wave transmitter 1 is configured such that an IF-band modulated signal output from an IF signal generation section 4 is input to a mixer 3 to which a local oscillation signal obtained from a local oscillator 2 is input, and unnecessary components are removed by means of a band-pass filter 5 so as to obtain a radio-frequency (RF)-band modulated signal. Further, a portion of the power of the local oscillation signal used for frequency conversion is added to the RF-band modulated signal, and a resultant signal is amplified by means of an amplifier 6, and is transmitted from a transmission antenna 7. Thus, the signal is transmitted from the transmitter. As shown in the spectrum of the transmitted signal of FIG. 2, the signal is composed of the RF-band modulated signal and the local oscillation signal having a phase noise characteristic coherent with that of the modulated signal.

Figure 3:
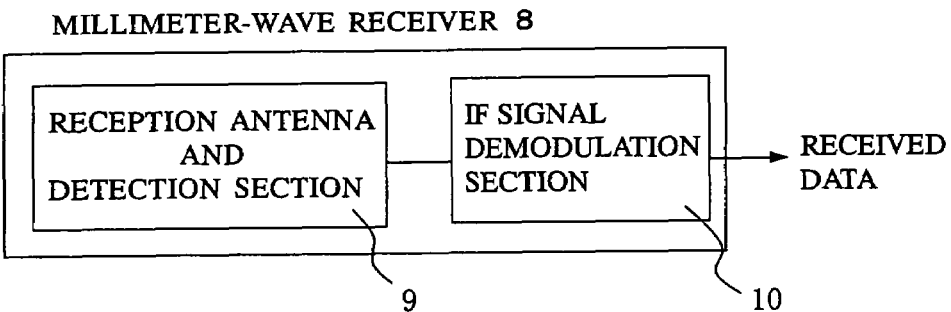
FIGS. 3(A) and 3(B) are diagrams exemplifying the configuration of a receiver which includes a planar printed antenna and a micro planar circuit formed by use of an MMIC technique.
Figure 3:
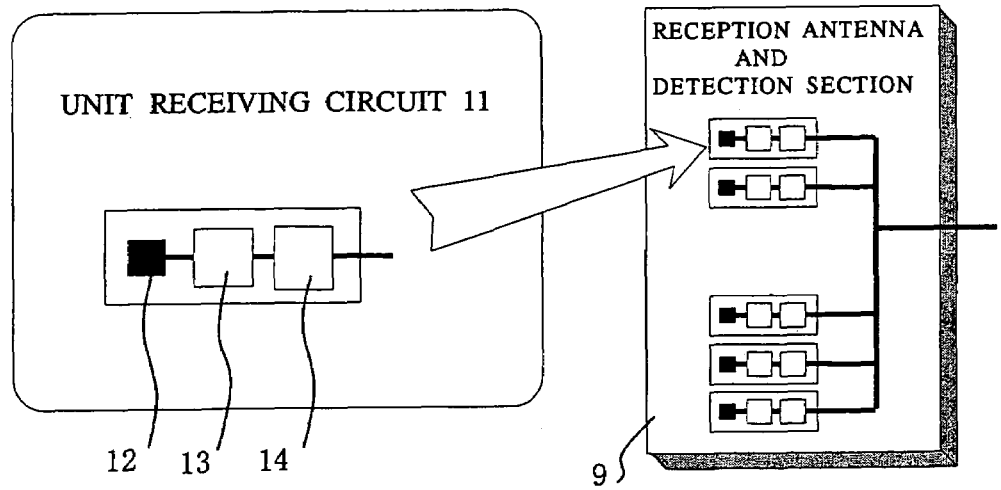

FIGS. 3(A) and 3(B) are diagrams exemplifying the configuration of a receiver which includes a planar printed antenna and a micro planar circuit formed by use of an MMIC technique. FIG. 3(A) exemplifies the overall configuration of the receiver. FIG. 3(B) exemplifies the details of a reception antenna and detection section. The signal transmitted from the transmitter is received and detected by means of a reception antenna and detection section 9, and its output is input to an IF signal demodulation section 10 where the received data are demodulated.

A plurality of unit receiving circuits 11 are disposed in the reception antenna and detection section 9. These unit receiving circuits (antennas) 11 are disposed at intervals sufficiently smaller than a wavelength corresponding to an IF band. Each unit receiving circuit 11 is composed of a planar printed antenna 12 such as a patch antenna, and an amplifier circuit 13 and a mixer circuit 14 functioning as a squaring unit, which are formed on a micro planar circuit by an MMIC technique. The outputs of the individual unit receiving circuits 11 are power mixed, and then fed to the IF signal demodulation section.

Each unit receiving circuit 11, including the antenna, can be made compact by use of an MMIC technique. Since an oscillator is not required to be incorporated into the unit receiving circuit 11, the unit receiving circuit 11 is basically low cost. In addition, since the IF signals obtained at the outputs of the unit receiving circuits 11 are synchronized with one another in terms of phase and frequency, composite diversity can be readily realized through mixing these IF signals. Moreover, since the composing circuit is for the IF band, it does not require the accuracy on the order corresponding to the wavelength of millimeter waves.

By virtue of the composite diversity effect, the unit receiving circuits 11, as a whole, operate as a high-sensitive receiving circuit. Unlike the case of an ordinary receiving array antenna system, since the unit receiving circuits (antennas) are disposed at intervals sufficiently smaller than a wavelength corresponding to the IF band, the composite diversity effect can be attained without affecting the receiving beam pattern. Moreover, by virtue of the spatial diversity effect, it becomes possible to cope with signal phasing (e.g., considerable attenuation of a received signal depending on the receiving position), which is peculiar to millimeter-wave transmission.

The arrangement of the above-described unit receiving circuits will now be described in more detail. For example, a signal received by a communication system for a millimeter-wave band (frequency $f_{rf}$) has a wavelength ($\lambda_{rf}$) on the millimeter order. Therefore, in the case where an attempt is made to receive such a signal by use of a plurality of antennas disposed in a receiver and to mix the outputs of the antennas, unless the antennas are disposed at intervals sufficiently smaller than the very short wavelength, a slight time difference $\Delta\tau$ is produced between arrival times at the individual receiving antennas if the receiver receives an incoming wave while forming a slight angle with respect to the traveling direction of the incoming wave. Such a slight time difference $\Delta\tau$ appears as a large phase difference of $2\pi f_{rf}\Delta\tau$ as measured before mixing. When the signals before being mixed have phase differences, a sufficient composite amplitude (composite power) cannot obtained through mixing, so that the obtained gain characteristic deteriorates. Further, in an extreme case, no receiving gain is attained under the condition that phase differences before mixing are completely canceled one another (for the incoming direction).

However, in a system for the 60 GHz band (wavelength: 5 mm), for example, disposing receiving antennas at intervals sufficiently narrower than 5 mm is extremely difficult, from the viewpoint of mounting. In order to cope with such a problem, in the system of the present invention, a radio modulated signal (frequency $f_{rf}$) and an un-modulated carrier (frequency $f_1$) which are coherent with each other are transmitted simultaneously; these are subjected to square-law detection so as to obtain an IF-band signal (frequency $f_{if}$), which is a difference frequency component; and a plurality of IF-band signals thus obtained are mixed. Since the difference $\Delta\tau$ in reception arrival time produced among the different antennas is the same for both the radio modulated signal and the un-modulated carrier, phase differences of millimeter-wave band signals which are intrinsically produced among the receiving circuits are cancelled one another after detection. Accordingly, only a phase difference $2\pi(f_{rf}-f_1)\Delta\tau(=2\pi f_{if}\Delta\tau)$, which corresponds to an IF-band wavelength, appears after detection and before mixing. For example, in a case where an IF band of 600 MHz (50 cm) is used in the system for the 60 GHz band (wavelength: 5 mm), it is easy to dispose receiving antennas at intervals sufficiently narrower than the IF-band wavelength of 50 cm (e.g., at intervals of $\lambda_{if}/20$ or less). Further, even when the receiver receives a signal wave with an angle with respect to the traveling direction of the incoming wave, a good receiving gain characteristic can be obtained, because the phase difference $2\pi f_{if}\Delta\tau$ produced between different receiving circuit outputs can be considered to be nearly zero.

Embodiment 1

Figure 4:
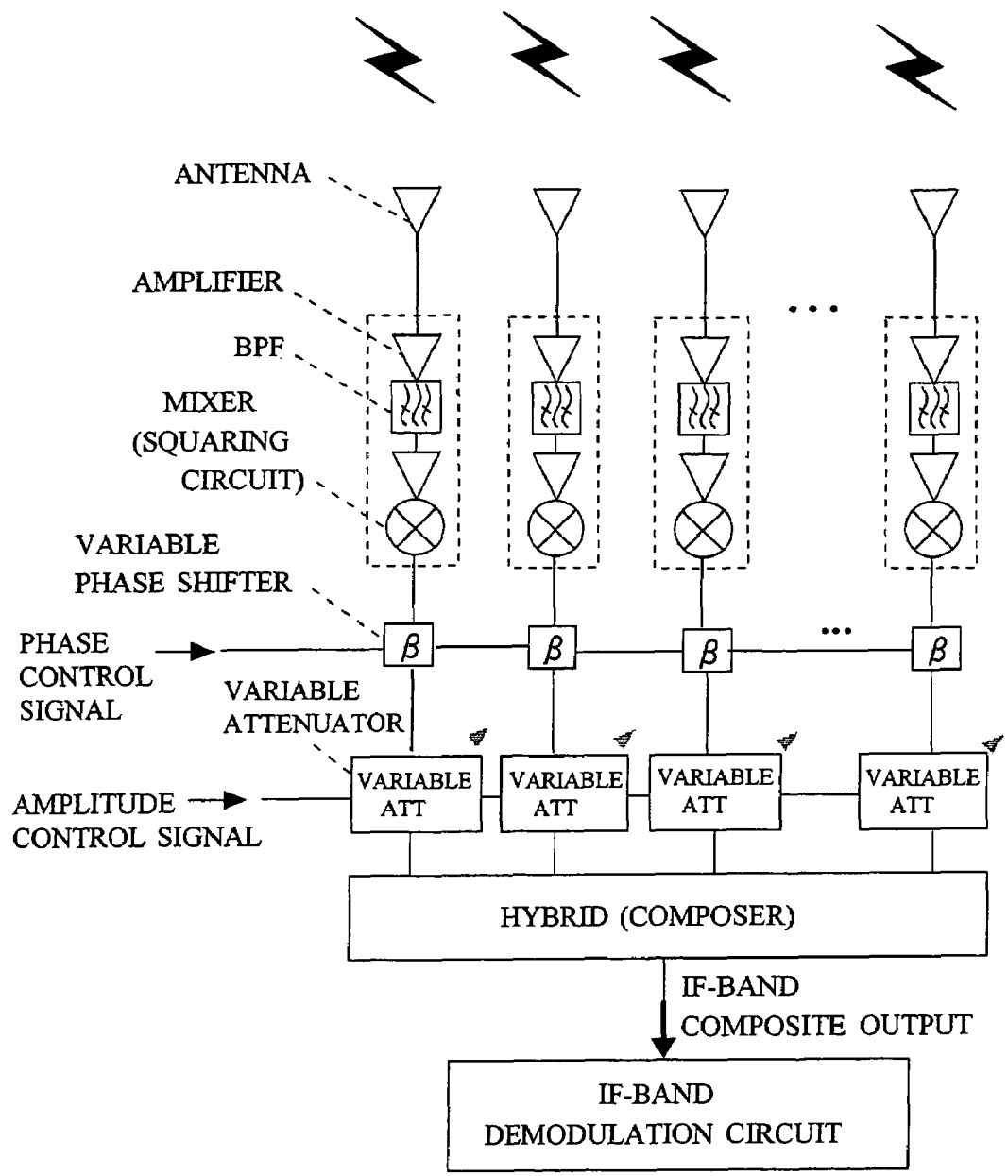
FIG. 4 is a diagram showing a receiving circuit (Embodiment 1) which embodies the basic configuration shown in FIG. 1.

FIG. 4 is a diagram showing a receiving circuit (Embodiment 1) which embodies the basic configuration shown in FIG. 1. In Embodiment 1, at the time of mixing IF outputs, phase adjustment and amplitude weighting are performed for the IF outputs to be mixed, whereby the receiving beam pattern can be controlled. In the illustrated example, each IF output is passed through a variable phase shifter and a variable attenuator, and is then fed to a composer for power mixing. In the variable phase shifter β, the phase of the IF output is adjusted on the basis of a phase control signal. In the variable attenuator (variable ATT), amplitude weighting is performed for the IF output on the basis of an amplitude control signal. Notably, in place of the above configuration for analog control, there can be employed digital beam forming in which the IF outputs are converted to digital outputs, and digital processing is performed for the digital outputs.

The illustrated configuration enables easy realization, in the millimeter-wave band, of an array antenna and an adaptive array antenna which can form a receiving beam pattern for receiving only a signal from a certain incoming direction, or removing interference wave signals received from a certain incoming direction.

In general, in order to realize an array antenna and an adaptive array antenna in the millimeter-wave band, very high accuracy is required for phase control because of short wavelength. However, by virtue of the illustrated configuration, such an array antenna can be realized with accuracy as low as that corresponding to the IF-band wavelength. Since such an array antenna can be realized by use of a technique for adaptive array antennas realized in the micro-wave band, cost can be reduced easily.

Embodiment 2

Figure 5:
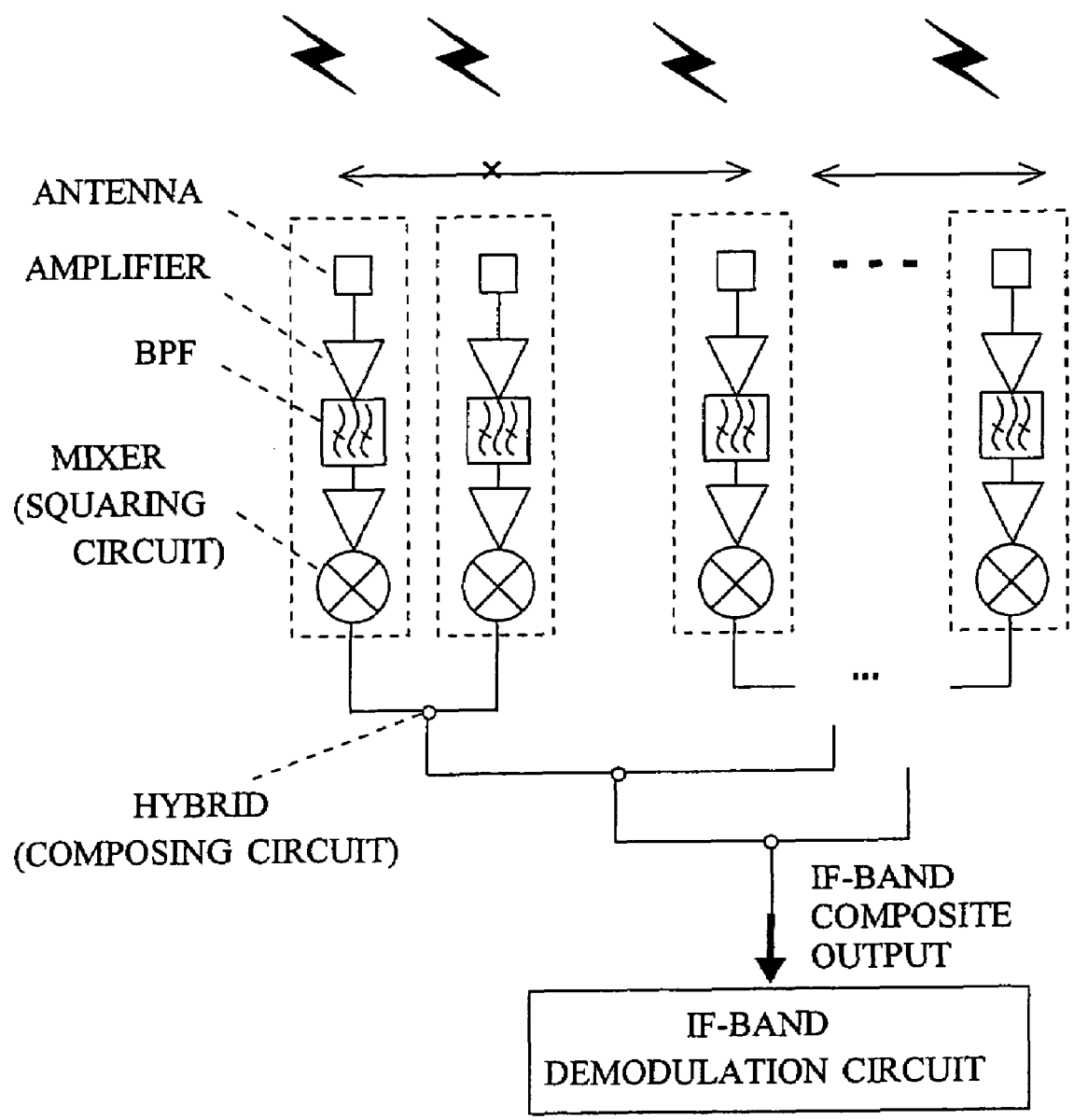
FIG. 5 is a diagram showing a receiving circuit (Embodiment 2) which embodies the basic configuration shown in FIG. 1.

FIG. 5 is a diagram showing a receiving circuit (Embodiment 2) which embodies the basic configuration shown in FIG. 1. In the illustrated example, three or more (a plurality of) unit receiving circuits (receiving antennas) are not disposed at constant intervals, but are disposed irregularly; e.g., at prime intervals or logarithmic distribution intervals. Even in the case where two or more receiving circuits are disposed, if the intervals are constant, signal phasing inevitably occurs under a certain condition (at a certain distance between the millimeter-wave transmitter and receiver or at a certain height). In contrast, when three or more receiving circuits are disposed at irregular intervals, signal phasing can be prevented in most cases.

Embodiment 3

FIGS. 6(A) and 6(B) are diagrams showing a receiving circuit (Embodiment 3) which embodies the basic configuration shown in FIG. 1. In the receiver configuration shown in FIG. 6(A), a plurality of unit receiving circuits are not arranged on a circuit arrangement plane along a certain direction, but are arranged two-dimensionally; i.e., along directions (transverse direction and longitudinal direction) which intersect at angles of 90°, and outputs of the unit receiving circuits are mixed. Alternatively, as shown in FIG. 6(B), a plurality of unit receiving circuits may be arranged three-dimensionally by arranging them on a spherical surface or the surface of a cube.

In general, a multi path phenomenon occurs in both the vertical and horizontal directions, rather than in just one of these directions. Accordingly, through employment of the illustrated arrangement, multi-path phasing generated in any direction can be avoided.

Embodiment 4

Figure 6:
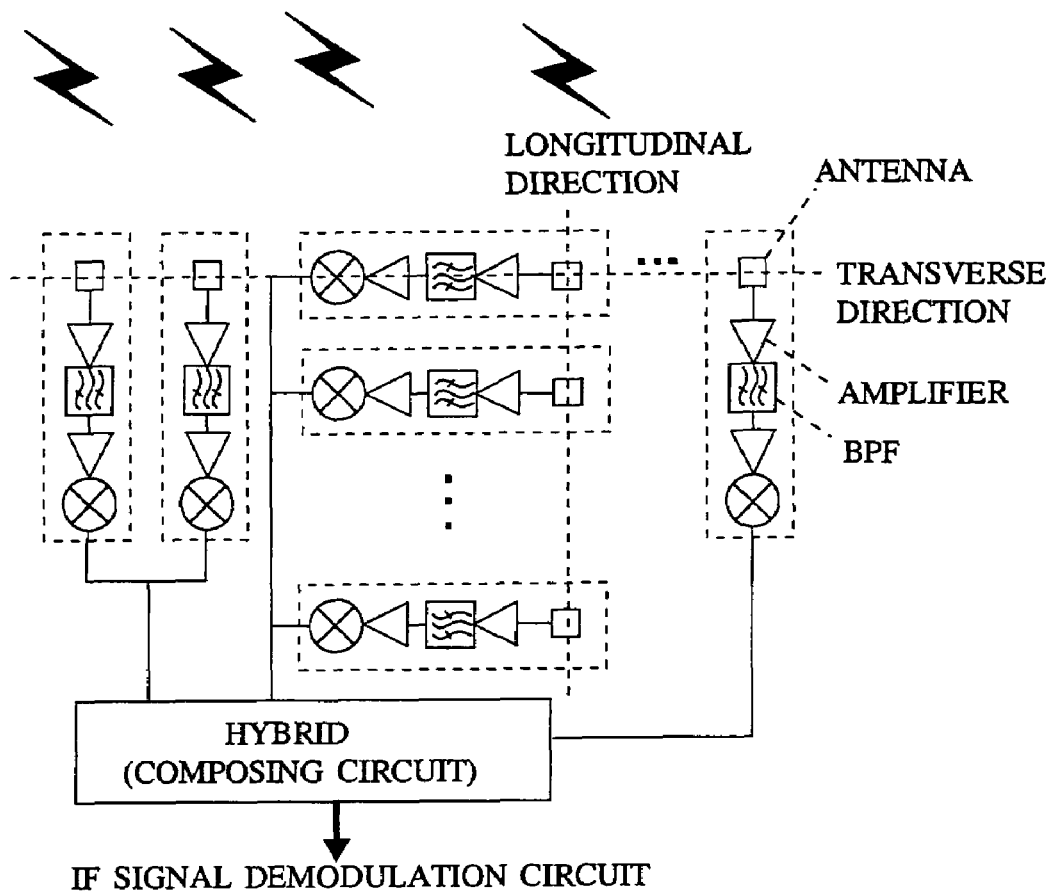
FIGS. 6(A) and 6(B) are diagrams showing a receiving circuit (Embodiment 3) which embodies the basic configuration shown in FIG. 1.
Figure 6:
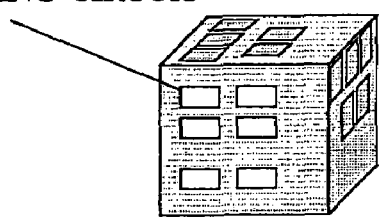

As in Embodiment 3 shown in FIG. 6, the unit receiving circuits are arranged two-dimensionally or three-dimensionally, and their outputs are mixed. Meanwhile, an antenna for circularly polarized waves is used in the transmission circuit, whereby the receiving diversity effect becomes effective in all directions of the transmitter and receiver.

Moreover, about half the antennas used in the receiving circuit are adapted to receive horizontally-polarized waves, and the remaining antennas are adapted to receive vertically-polarized waves. Thus, a polarized-wave diversity effect is also attained.

Embodiment 5

Figure 7:
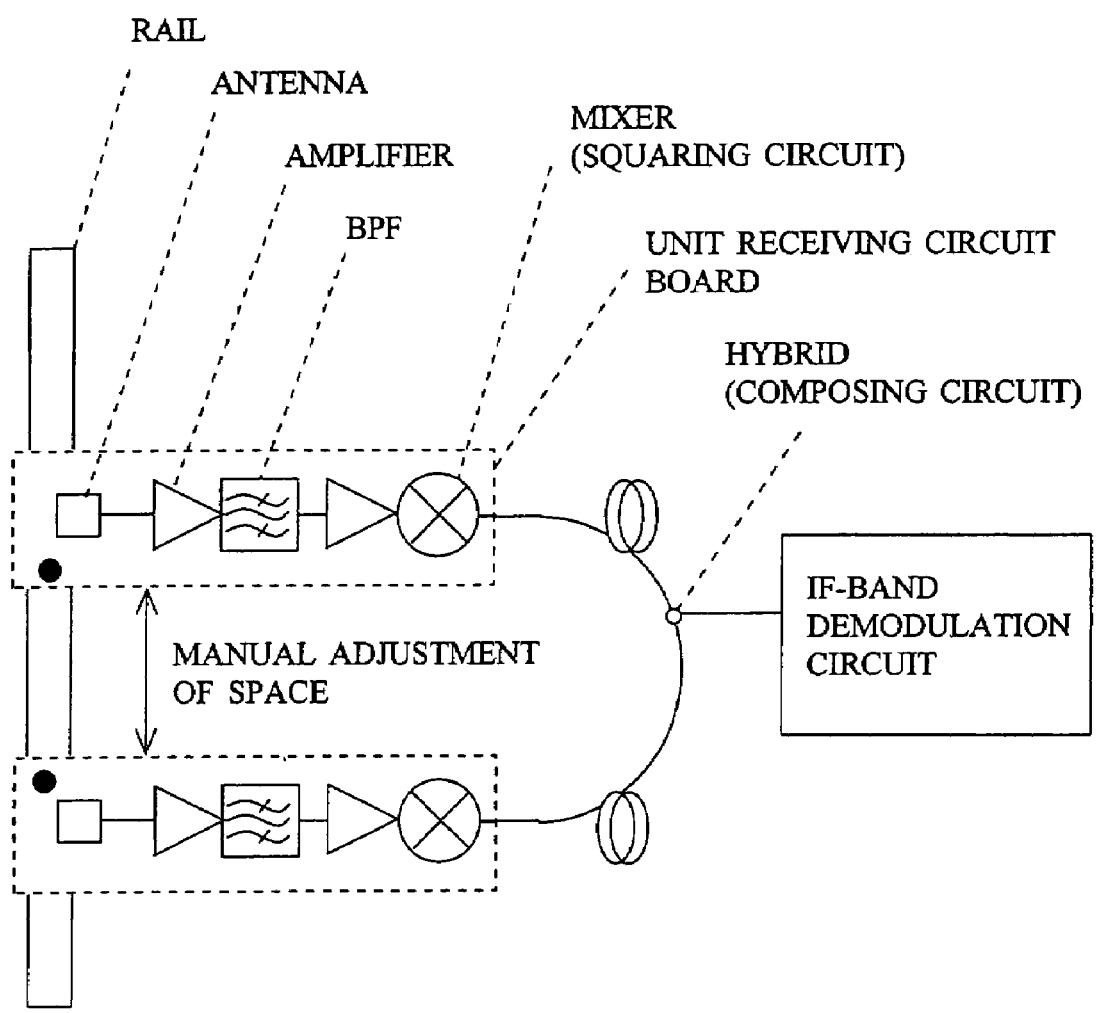
FIG. 7 is a diagram used for explaining interval adjustment in the system while taking, as an example, the case where two unit receiving circuits are used.

FIG. 7 is a diagram used for explaining interval adjustment in the system while taking, as an example, the case where two unit receiving circuits are used. Each unit receiving circuit is fixed to a rail by means of, for example, screw-fastening. If necessary, the interval between the unit receiving circuits can be manually adjusted continuously or stepwise. This configuration enables a radio terminal to be installed and used with an antenna interval suitable for an expected communication environment.

Figure 8:
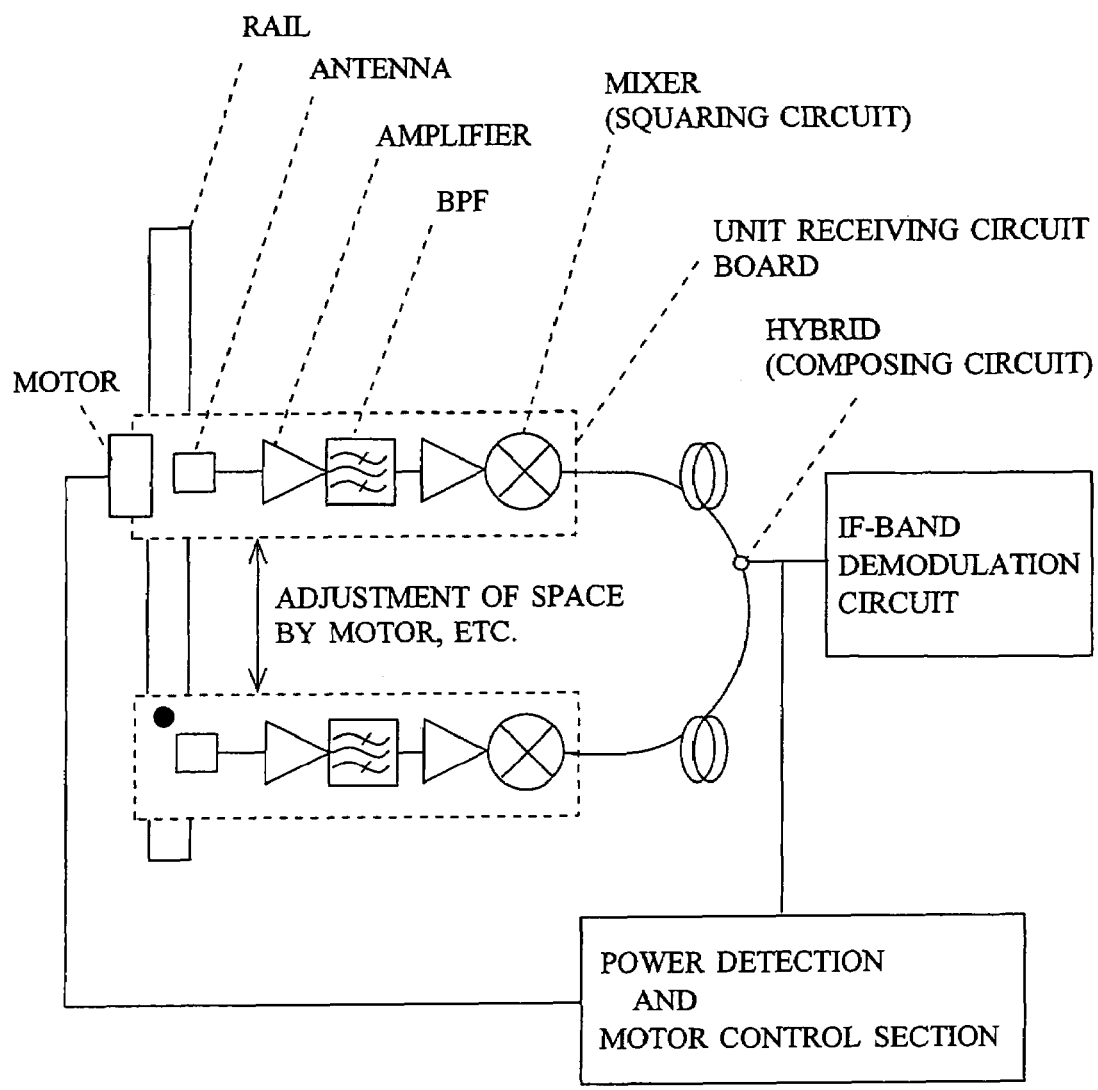
FIG. 8 is another diagram used for explaining interval adjustment in the system while taking, as an example, the case where two unit receiving circuits are used.
Figure 9:
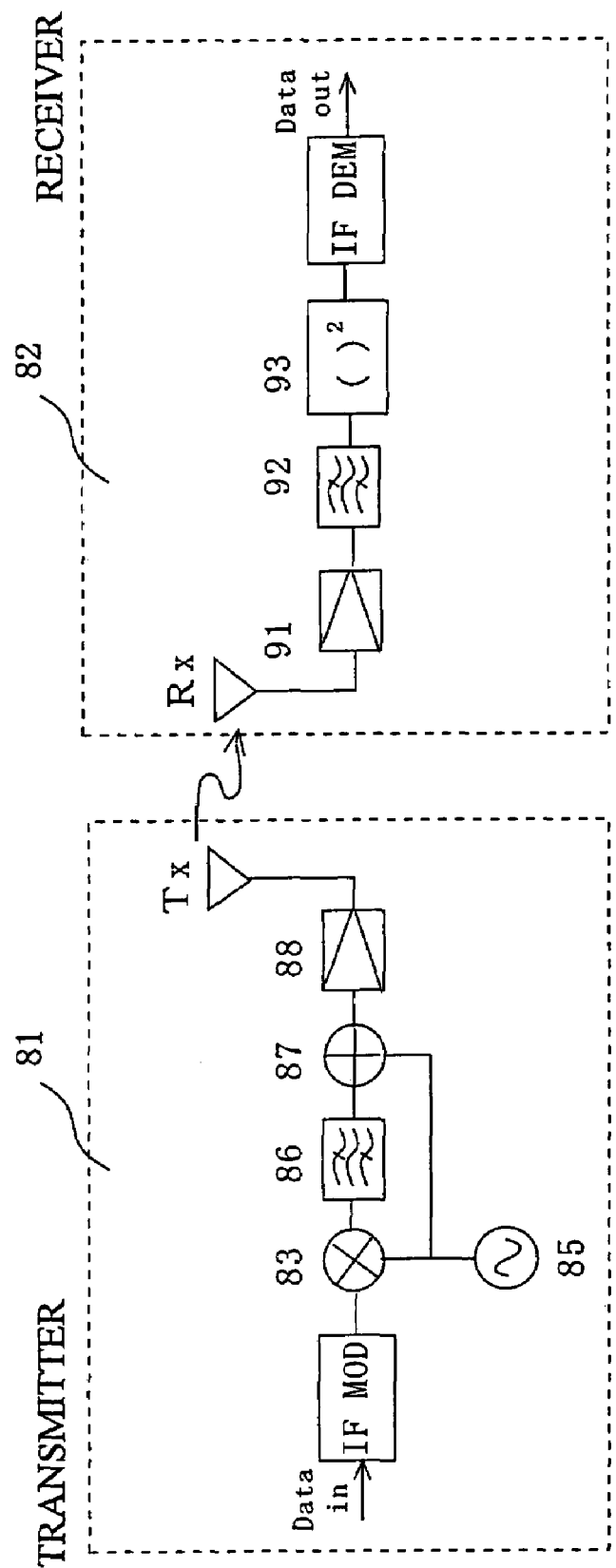
FIG. 9 is a diagram used for explaining a conventional radio communication apparatus (self-heterodyne scheme).

FIG. 8 is another diagram used for explaining interval adjustment in the system while taking, as an example, the case where two unit receiving circuits are used. In the illustrated example, in addition to the structure of FIG. 7, the following structure is employed. Of substrates to which the unit receiving circuits are attached, except for one substrate serving as a reference, the other substrate is attached to the rail via a moving mechanism such as a motor. The motor is controlled by means of a power detection and motor control section. This power detection and motor control section detects a signal output power after mixing by means of a composing circuit, and controls the motor on the basis of the detection signal. By means of this control, at the time of resetting the adjustment mechanism, or at all times, the interval between the substrates is automatically adjusted such that the signal output power after mixing by means of the composing circuit attains maximum within the movable range of the movable unit receiving circuit. This configuration eliminates necessity of manual adjustment, and effective attainment of a diversity receiving effect under any condition by use of a small number of the unit receiving circuits.

INDUSTRIAL APPLICABILITY

According to the present invention, radio communications of a self-heterodyne scheme are performed. Therefore, in the transmitter, a low cost local oscillator which is instable in frequency and is large in phase noise can be used. In the receiver, a local oscillator itself is not required, so that a very low cost radio communication system can be constructed. In addition, since the above-described frequency instability is removed at the time of detection, transmission of high quality signals is possible (effect of the self-heterodyne scheme).

According to the present invention, since in-phase mixing of signals obtained from the individual antenna elements of the array can be performed in an IF band sufficiently lower than a radio frequency band, the in-phase mixing does not require high wiring and machining accuracy, and can be easily realized.

According to the present invention, the unit receiving circuits can be disposed very close to each other, and can be configured such that phase differences among RF-band signals received by the antenna elements of the array decrease to a substantially ignorable level at the point where the receiving circuits output detection outputs. Therefore, it is possible to realize a receiving antenna which has a high gain and a very broad beam, which is similar to the angle versus relative gain characteristic of a single-element antenna.

The invention claimed is:

1. A millimeter-wave band radio communication method in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the method comprising:

disposing a plurality of receiving circuits, each formed as a single constituent element by combining a planar printed small receiving antenna and a micro planar receiving circuit, at intervals smaller than a wavelength corresponding to an IF band;

mixing signals detected at individual ones of the receiving circuits to output an IF-band composite output, which is then demodulated; and before mixing the signals, making phase adjustment and amplitude weighting of each of the signals respectively detected by one of the receiving circuits.

2. A millimeter-wave band radio communication method in which a receiver receives both an RF-band modulated signal and an un-modulated carrier transmitted from the transmitter, the un-modulated carrier having a phase noise characteristic coherent with that of the RF-band modulated signal, and generates a product of received signals to thereby restore an IF-band transmission source signal, the method comprising:

disposing a plurality of receiving circuits, each formed as a single constituent element by combining a planar printed small receiving antenna and a micro planar receiving circuit, at intervals smaller than a wavelength corresponding to an IF band, three or more of the receiving circuits being disposed at irregular intervals which differ from one another; and mixing signals detected at individual ones of the receiving circuits to output an IF-band composite output, which is then demodulated.

3. A millimeter-wave band radio communication method in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the method comprising:

disposing a plurality of receiving circuits, each formed as a single constituent element by combining a planar printed small receiving antenna and a micro planar receiving circuit, at intervals smaller than a wavelength corresponding to an IF band;

mixing signals detected at individual ones of the receiving circuits to output an IF-band composite output, which is then demodulated; and providing two or more substrates each carrying at least one receiving circuit, and changing intervals between the substrates manually or automatically in accordance with power of the IF-band composite output.

4. A millimeter-wave band radio communication method in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the method comprising:

disposing a plurality of receiving circuits, each formed as a single constituent element by combining a planar printed small receiving antenna and a micro planar receiving circuit, at intervals smaller than a wavelength corresponding to an IF band, the receiving circuits being arranged two-dimensionally along longitudinal and transverse directions or three-dimensionally; and mixing signals detected at individual ones of the receiving circuits to output an IF-band composite output, which is then demodulated.

5. A millimeter-wave band radio communication method according to claim 4, wherein an antenna used in the transmitter is adapted to transmit circularly polarized waves, and about a half of antennas in the receiving circuits are adapted to receive horizontally polarized waves and the other half of the antennas in the receiving circuits are adapted to receive vertically polarized waves.

6. A millimeter-wave band radio communication system in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the system comprising:

a plurality of receiving circuits each formed as a single constituent element by combining a planar printed small receiving antenna and a micro planar receiving circuit, and disposed at intervals smaller than a wavelength corresponding to an IF band;

a detection output composing section that mixes signals detected at individual ones of the receiving circuits to output an IF-band composite output;

an IF signal demodulation section that receives the IF-band composite output from the detection output composing section, and demodulates the IF-band composite output; and a variable phase shifter and a variable attenuator that perform phase adjustment and amplitude weighting, respectively, for each signal respectively detected by a receiving circuit before the detection output composing section mixes the signals.

7. A millimeter-wave band radio communication system in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the system comprising:

a plurality of receiving circuits each formed as a single constituent element by combining a planar printed small receiving antenna and a micro planar receiving circuit, and disposed at intervals smaller than a wavelength corresponding to an IF band;

a detection output composing section that mixes signals detected at individual ones of the receiving circuits to output an IF-band composite output; and an IF signal demodulation section that receives the IF-band composite output from the detection output composing section, and demodulates the IF-band composite output, wherein three or more of the receiving circuits are provided and disposed at irregular intervals which differ from one another.

8. A millimeter-wave band radio communication system in which a receiver receives both an RF-band modulated signal transmitted and an un-modulated carrier transmitted from a transmitter, the un-modulated carrier having a phase noise characteristic coherent with that of the RF-band modulated signal, and generates a product of received signals to thereby restore an IF-band transmission source signal, the system comprising:

a plurality of receiving circuits each formed as a single constituent element by combining a planar printed small receiving antenna and a micro planar receiving circuit, and disposed at intervals smaller than a wavelength corresponding to an IF band;

a detection output composing section that mixes signals detected at individual ones of the receiving circuits to output an IF-band composite output; and an IF signal demodulation section that receives the IF-band composite output from the detection output composing section, and demodulates the IF-band composite output, wherein two or more substrates each carrying at least one receiving circuit are provided, and intervals between the substrates are changed manually or automatically in accordance with power of the IF-band composite output.

9. A millimeter-wave band radio communication system in which a receiver receives both an RF-band modulated signal and an un-modulated carrier transmitted from a transmitter, the un-modulated carrier having a phase noise characteristic coherent with that of the RF-band modulated signal, and generates a product of received signals to thereby restore an IF-band transmission source signal, the system comprising:

a plurality of receiving circuits each formed as a single constituent element by combining a planar printed small receiving antenna and a micro planar receiving circuit, and disposed at intervals smaller than a wavelength corresponding to an IF band;

a detection output composing section that mixes signals detected by individual ones of the receiving circuits to output an IF-band composite output; and an IF signal demodulation section that receives the IF-band composite output from the detection output composing section, and demodulates the IF-band composite output, wherein the receiving circuits are arranged two-dimensionally along longitudinal and transverse directions or three-dimensionally.

10. A millimeter-wave band radio communication system according to claim 9, wherein an antenna used in the transmitter is adapted to transmit circularly polarized waves, and about half or a portion of antennas of the receiving circuits are adapted to receive first polarized waves and the other antennas are adapted to receive second polarized waves having a second polarization direction perpendicular to a first polarization direction of the first polarized waves.

* * * * *